US009220053B2

(12) United States Patent
Bombacino et al.

(10) Patent No.: US 9,220,053 B2
(45) Date of Patent: Dec. 22, 2015

(54) AFFILIATION OF MOBILE STATIONS AND PROTECTED ACCESS POINTS

(71) Applicant: International Business Machines Corporation, Armonk, NY (US)

(72) Inventors: Vinicio Bombacino, Rome (IT); Maximiliano Cammisa, Rome (IT); Leonardo Lanni, Rome (IT); Riccardo Pizzutilo, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/048,102

(22) Filed: Oct. 8, 2013

(65) Prior Publication Data
US 2014/0105008 A1 Apr. 17, 2014

(30) Foreign Application Priority Data

Oct. 17, 2012 (GB) .................................. 1218593.0

(51) Int. Cl.
*H04W 4/00* (2009.01)
*H04W 48/06* (2009.01)
*H04L 29/06* (2006.01)
*H04W 12/08* (2009.01)

(52) U.S. Cl.
CPC ............. *H04W 48/06* (2013.01); *H04L 63/105* (2013.01); *H04W 12/08* (2013.01)

(58) Field of Classification Search
None
See application file for complete search history.

(56) References Cited

U.S. PATENT DOCUMENTS

| 5,577,101 | A  | 11/1996 | Bohm |
| 7,092,716 | B2 | 8/2006 | Nizri et al. |
| 7,263,076 | B1 | 8/2007 | Leibovitz et al. |
| 7,466,986 | B2 | 12/2008 | Halcrow et al. |
| 8,041,815 | B2 | 10/2011 | Bahl et al. |

(Continued)

FOREIGN PATENT DOCUMENTS

EP  1 241 903 A2  9/2002

OTHER PUBLICATIONS

PCT Notification of Transmittal of the International Search Report and the Written Opinion of the International Searching Authority, or the Declaration (PCT/ISA/210), the International Search Report (PCT/ISA/220) and the Written Opinion of the International Searching Authority (PCT/ISA/237) dated Nov. 28, 2013, International Application No. PCT/EP2013/069810, 9 pages.

(Continued)

*Primary Examiner* — Frank Duong
(74) *Attorney, Agent, or Firm* — Francis Lammes; Stephen J. Walder, Jr.; William J. Stock

(57) ABSTRACT

A solution for accessing a network is provided. Particularly, an embodiment of the invention provides for operating a wireless network access point providing an access to a network over a wireless connection, the access point being protected for limiting the access to the network to entitled users. A request to access the network is received from a mobile station. An entitlement of the mobile station to access the network through the access point is verified. An affiliation of the mobile station to an affiliation group of the access point is verified when the mobile station is not entitled, the affiliation group comprising a plurality of access points and a plurality of mobile stations. The access to the network is granted when the mobile station is affiliated, and the access to the network is denied when the mobile station is not affiliated.

18 Claims, 7 Drawing Sheets

(56) References Cited

U.S. PATENT DOCUMENTS

| | | |
|---|---|---|
| 8,140,112 B2 | 3/2012 | Shaheen et al. |
| 2004/0077336 A1 | 4/2004 | Lauriol |
| 2004/0156372 A1 | 8/2004 | Hussa |
| 2005/0025164 A1 | 2/2005 | Kavanagh et al. |
| 2005/0143094 A1 | 6/2005 | Reed et al. |
| 2005/0286476 A1 | 12/2005 | Crosswy et al. |
| 2006/0190601 A1 | 8/2006 | Lee et al. |
| 2007/0082654 A1 | 4/2007 | Hovnanian et al. |
| 2007/0167173 A1* | 7/2007 | Halcrow et al. ............ 455/456.2 |
| 2007/0167174 A1 | 7/2007 | Halcrow et al. |
| 2007/0268908 A1* | 11/2007 | Linkola et al. ............ 370/395.2 |
| 2007/0297455 A1 | 12/2007 | McParland |
| 2008/0141348 A1 | 6/2008 | Hovnanian et al. |
| 2010/0195632 A1 | 8/2010 | Prabhu |
| 2011/0081890 A1 | 4/2011 | Ahmadvand et al. |
| 2011/0159818 A1 | 6/2011 | Scherzer et al. |
| 2012/0322407 A1* | 12/2012 | Haberman .................... 455/411 |

OTHER PUBLICATIONS

Search Report under Section 17(5), Application No. GB1218593.0 dated Feb. 14, 2013, 6 pages.

Ala-Laurila, Juha et al., "Wireless LAN Access Network Architecture for Mobile Operators", IEEE Communications Magazine, Nov. 2001, pp. 82-89.

Nakai, Yuto et al., "WiFi Access Point Discovery System for Mobile Users", 2011 Eighth International Joint Conference on Computer Science and Software Engineering (JCSSE), May 11-13, 2011, pp. 75-79.

Ott, Jorg et al., "Towards Automated Authentication for Mobile Users in WLAN Hot-Spots", IEEE 62nd Vehicular Technology Conference, Sep. 25-28, 2005, 10 pages.

* cited by examiner

AFFILIATION OF MOBILE STATIONS AND PROTECTED ACCESS POINTS

BACKGROUND

The solution according to one or more embodiments of the present invention relates to the network field. More specifically, this solution relates to wireless network access.

Networks are commonly used to interconnect remote data-processing systems, in order to share resources and information; a typical example is the Internet, which is formed by billions of computers connected one to another through a global communication network.

The access to the Internet is more and more often implemented with wireless techniques (i.e., without any physical connection). This is manly due to the widespread diffusion of mobile stations (MB), such as smart-phones, which are commonly used to access the Internet while around; particularly, the increasing need of relying on remote services leveraging the Internet may require the capability of connecting to the Internet almost from everywhere.

A commonplace solution for accessing the Internet with a mobile station is of connecting to a wireless network Access Point (AP)—typically based on the Wireless Fidelity (Wi-Fi) technology; the access point relays information between each mobile station connected thereto and the Internet (which the access point is connected to in a wired way). The access point may be either unprotected or protected. An unprotected access point allows accessing the Internet by whatever mobile station within its transmission range (for example, in public locations); conversely, a protected access point requires some sort of authentication/registration before granting the access to the Internet (for example, to restrict its access or to collect a payment).

Alternatively, it is possible to use a mobile telephone infrastructure—for example, based on the $3^{rd}$ generation (3 G) technology. However, a connection speed provided by the mobile telephone infrastructure is generally lower than that provided by the access points. Moreover, the mobile telephone infrastructure may be not always available with a bandwidth sufficient to provide an acceptable level of performance; for example, this may happen (especially in metropolitan areas) when the mobile telephone infrastructure is congested because too many mobile stations are connected thereto at the same time. In any case, the access to the Internet with the mobile telephone infrastructure is still quite expensive; this is particularly true abroad when it is necessary to exploit a local mobile telephone operator applying very high rates.

In order to tackle this problem, it is possible to roam from the mobile telephone infrastructure to an available access point when a higher connection speed is required (for example, as described in US-A-2005/0025164, the entire disclosure of which is herein incorporated by reference).

Moreover, US-A-2005/0143094 (the entire disclosure of which is herein incorporated by reference) discloses an access point locator service that may be offered by a mobile telephone operator; in this case, the mobile telephone operator determines the access point being closest to each mobile station (according to its current position) and notifies it to the mobile station (either in a push mode or in a pull mode).

US-A 20105159818 (the entire disclosure of which is herein incorporated by reference) discloses a method wherein the mobile stations continually collect information about the unprotected access points (comprising their position as determined via a GPS system) into a shared database, which is then used to select a specific unprotected access point that is nearby each mobile station.

Likewise, in US-A-2007/0167174 (the entire disclosure of which is herein incorporated by reference) the mobile stations collect information about the unprotected access points into a shared database; in this case, each mobile station sends a request for nearby unprotected access points to a provider, which selects them from the database and returns corresponding information to the mobile station.

In US-A-2007/0297455 as well (the entire disclosure of which is herein incorporated by reference), the mobile stations collect information about the unprotected access points; in this case, each mobile station retrieves information about nearby unprotected access points directly from other mobile stations via a local connection. A similar technique is also disclosed in "WI-FI ACCESS POINT DISCOVERY SYSTEM FOR MOBILE USERS, Nakai, Y.; Ohshima, K.; Tajima, K.; Terada, M., Computer Science and Software Engineering (JCSSE), 2011 Eighth International Joint Conference on 11-13 May 2011, ISBN: 978-1-4577-0686-8" (the entire disclosure of which is herein incorporated by reference).

However, the unprotected access points are not available everywhere; all the more so, when around it is very difficult (if not almost impossible) to have protected access points available to which the mobile station is entitled to connect. Therefore, very often the mobile station is not within the transmission range of any access point which it may connect to. In this condition, the access to the Internet may be provided by the mobile telephone infrastructure only, if available (with the drawbacks pointed out above).

SUMMARY

In one illustrative embodiment, a method, in a data processing system, is provided for operating a wireless network access point providing an access to a network over a wireless connection, the wireless network access point being protected for limiting the access to the network to entitled users. The illustrative embodiment receives a request to access the network from a mobile station. The illustrative embodiment verifies an entitlement of the mobile station to access the network through the wireless network access point. The illustrative embodiment verifies an affiliation of the mobile station to an affiliation group of the wireless network access point when the mobile station is not entitled, the affiliation group comprising a plurality of wireless network access points and a plurality of mobile stations. The illustrative embodiment grants the access to the network when the mobile station is affiliated. The illustrative embodiment denies the access to the network when the mobile station is not affiliated.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
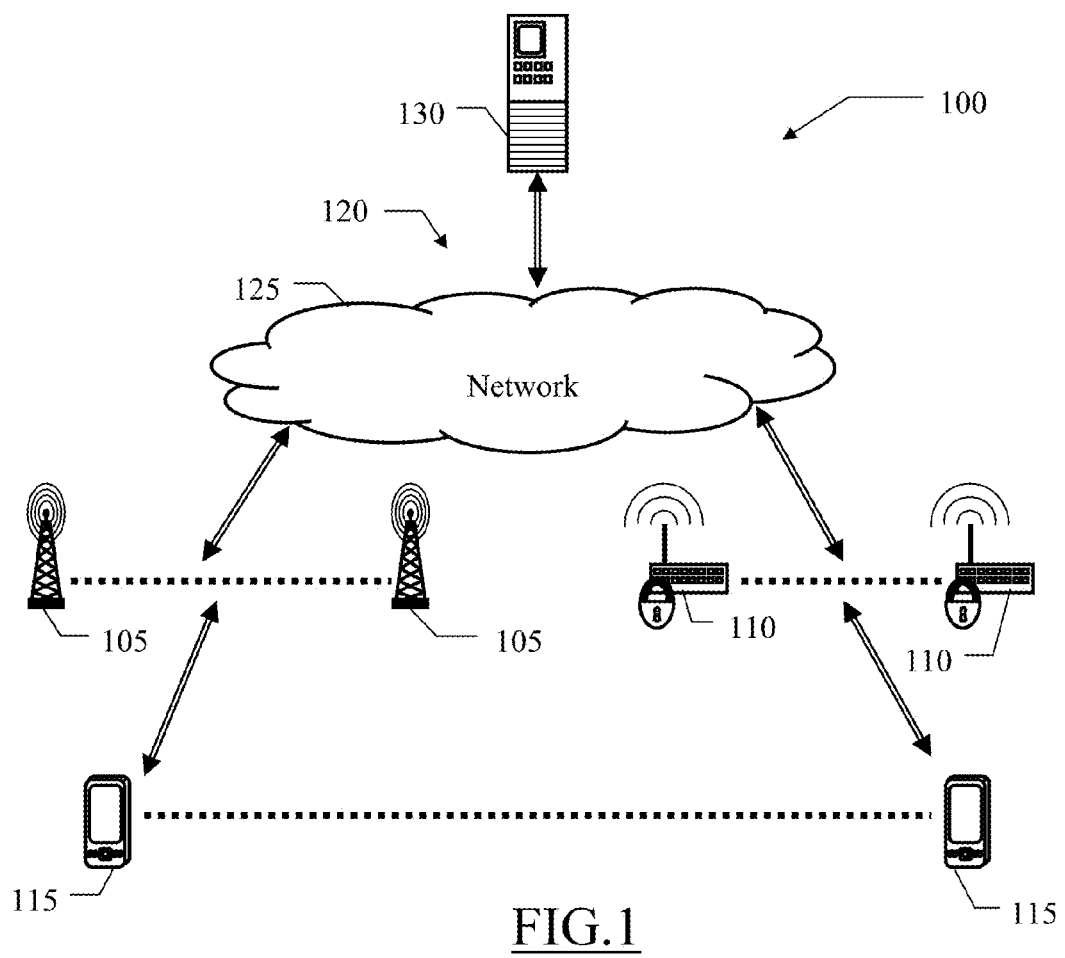
FIG. 1 shows a pictorial representation of a system wherein the solution according to an embodiment of the invention may be applied.

With reference in particular to FIG. 1, a pictorial representation is shown of a system 100 wherein the solution according to an embodiment of the invention may be applied.

The system 100 comprises a mobile telephone infrastructure 105 (for example, implementing different technologies from the GSM to the 3 G). The mobile telephone infrastructure 105 provides mobile telephone services (of either voice or data type) offered by corresponding mobile telephone operators; for this purpose, the mobile telephone infrastructure 105 comprises a number of base stations each one defining a mobile telephone cell.

The system 100 further comprises a number of (wireless network) access points 110—for example, of the Wi-Fi type. The access points 110 are used to connect different client stations within their transmission range into corresponding Wireless Local Area Networks (WLANs) based on the IEEE 802.11 specification; the access points 110 are also connected to a fixed-line telephone network, also known as Public Switched Telephone Network (PSTN), and through it to selected Internet Service Providers (ISPs)—not shown in the figure. The access points 110 are protected so as to limit the connection thereto only to entitled users (as indicated in the figure by means of corresponding locks). Particularly, the access points 110 may be private (for example, in a company WLAN or a home WLAN), in which case the connection is limited to registered users (defined by their unique identifiers—for example a corresponding MAC addresses) and/or conditioned to the entering of a secret password; in addition or in alternative, the access points 110 are commercial (for example, provided by commercial vendors), in which case the connection is conditioned to some sort of payment (for example, implemented through a captive portal requiring an authentication of users previously registered or their registration with the selection of a payment option). The access points 110 differ from unprotected access points that allow the connection thereto unconditionally (for example, in public access points, also known as hotspots, which allow the connection for free).

Mobile stations 115 (for example, smart-phones) may connect to either the mobile telephone infrastructure 105 or the access points 110 for accessing the Internet 120. The Internet 120 is formed by millions of computers (not shown in the figure), which are interconnected through a global communication network 125. Particularly, the Internet 120 comprises an affiliation server computer (or simply server) 130, which is used to manage the affiliation of the access points 110 and the mobile stations 115 (as described below). For the sake of simplicity, in the following the affiliation server 130 will be considered belonging to a common entity that is both a mobile telephone operator and an Internet service provider.

Figure 2:
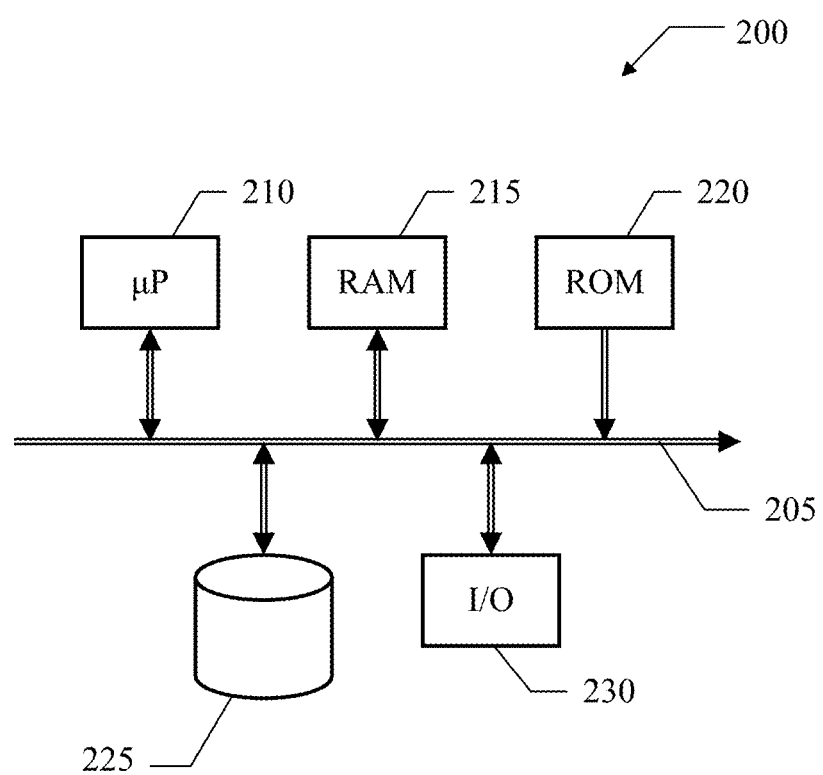
FIG. 2 shows a schematic block diagram of a generic data processing device of this system according to an embodiment of the invention.

A schematic block diagram of a generic data processing device of this system according to an embodiment of the invention is shown in the FIG. 2.

The device, denoted with the reference 200 (i.e., one of the access points, one of the mobile stations or the affiliation server) comprises several units that interface through a bus architecture 205 (with a structure that is suitably scaled according to the actual function of the device 200 in the system) Particularly, one or more microprocessors (µP) 210 control operation of the device 200; a RAM 215 is used as a working memory by the microprocessors 210, a ROM 220 stores a firmware defining a basic code of the device 200, and a mass memory 225 stores information to be preserved even when the power supply is off; for example, the mass memory 225 spans from an $E^2PROM$ for the access point, an internal flash memory and an external flash memory card (such as of the SD type) for the mobile station, and one or more harddisks and drives for reading/writing optical disks (such as CDs or DVDs) for the affiliation server. The device 200 is also provided with Input/Output (I/O) units 230. For example, the I/O units 230 of the access point comprise a Wireless Network Interface Card (WNIC) of the Wi-Fi type for communicating with the mobile stations, a switch for exchanging information among the mobile stations, and a router for connecting to the fixed-line telephone network. The I/O units 230 of the mobile station instead comprise a mobile telephone transceiver (TX/RX) for communicating with the mobile telephone infrastructure, a WNIC of the Wi-Fi type for communicating with the access points, a touch-screen, command buttons, a loudspeaker and a microphone. At the end, the I/O units 230 of the affiliation server comprise a NIC for connecting to the fixed-line telephone network, a keyboard, a mouse and a monitor.

Figure 3A:
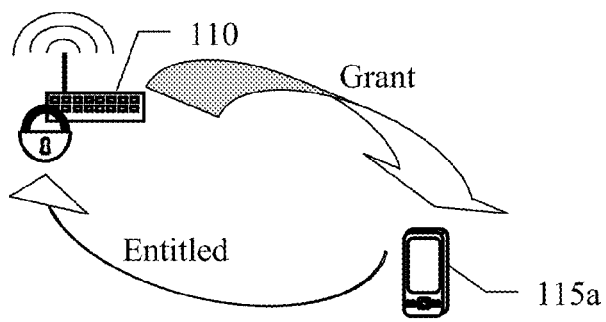
FIG. 3A-FIG. 3C show an exemplary scenario of application of the solution according to an embodiment of the invention.
Figure 3B:
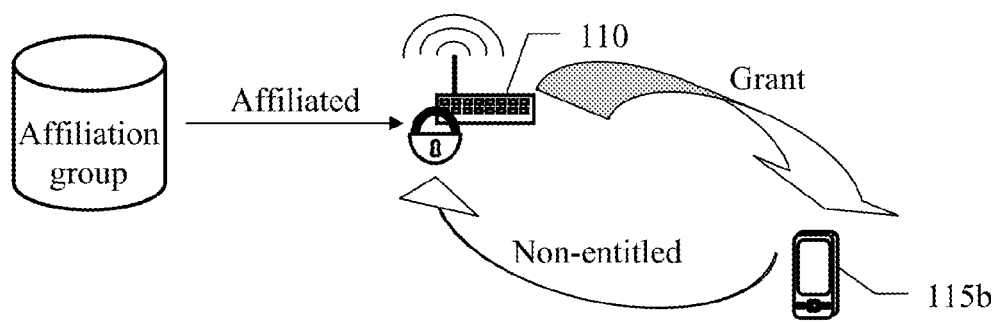
Figure 3C:
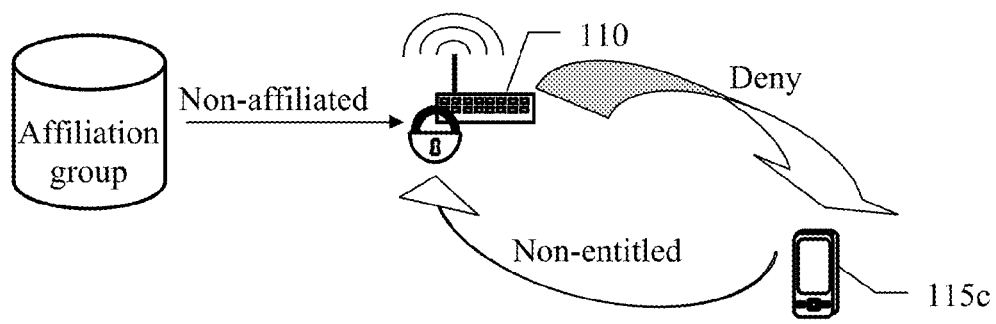

An exemplary scenario of application of the solution according to an embodiment of the invention is shown in the FIG. 3A-FIG. 3C.

Starting from the FIG. 3A, a user with his/her mobile station (differentiated with the reference 115a) tries to connect to one of the (protected) access points 110 for accessing the Internet (when the mobile station 115a is within its transmission range). If the mobile station 115a is entitled to connect to the access point 110 (for example, because it is recognized as registered or provides its correct password, and/or the user authenticates or enables any payment option), it is granted the access to the Internet as usual.

Moving to FIG. 3B, another user with his/her mobile station (differentiated with the reference 115b) tries to connect to the same access point 110 even if it is not entitled to do so.

In the solution according to an embodiment of the invention, in this case an affiliation of the mobile station 115b to an affiliation group of the access point 110 (comprising a plurality of access points and a plurality of mobile stations) is verified—for example, through the affiliation server. If the mobile station 115b and the access point 110 are affiliated (i.e., they belong to the same affiliation group), the mobile station 115b is again granted the access to the Internet (for example, with a limited bandwidth).

Referring at the end to the FIG. 3C, another user with his/her mobile station (differentiated with the reference 115c) tries to connect to the same access point 110. If the mobile station 115b is not entitled to connect to the access point 110 and it is not affiliated thereto, the access to the Internet is denied as usual.

In this way, the mobile stations may exploit the access points even when they are protected; for example, this may be very useful when no unprotected access points are available, or when it is not possible or not desirable to use the mobile telephone infrastructure (for example, because it is not available or congested, a higher connection speed is required, or the user cannot or does not want to pay for it, especially abroad).

This result is achieved in a transparent way for the access point, since it does not need to unprotect its connection; indeed, the access point remains protected, with the connection thereto that is granted only to the affiliated mobile stations independently of its protection.

Figure 4:
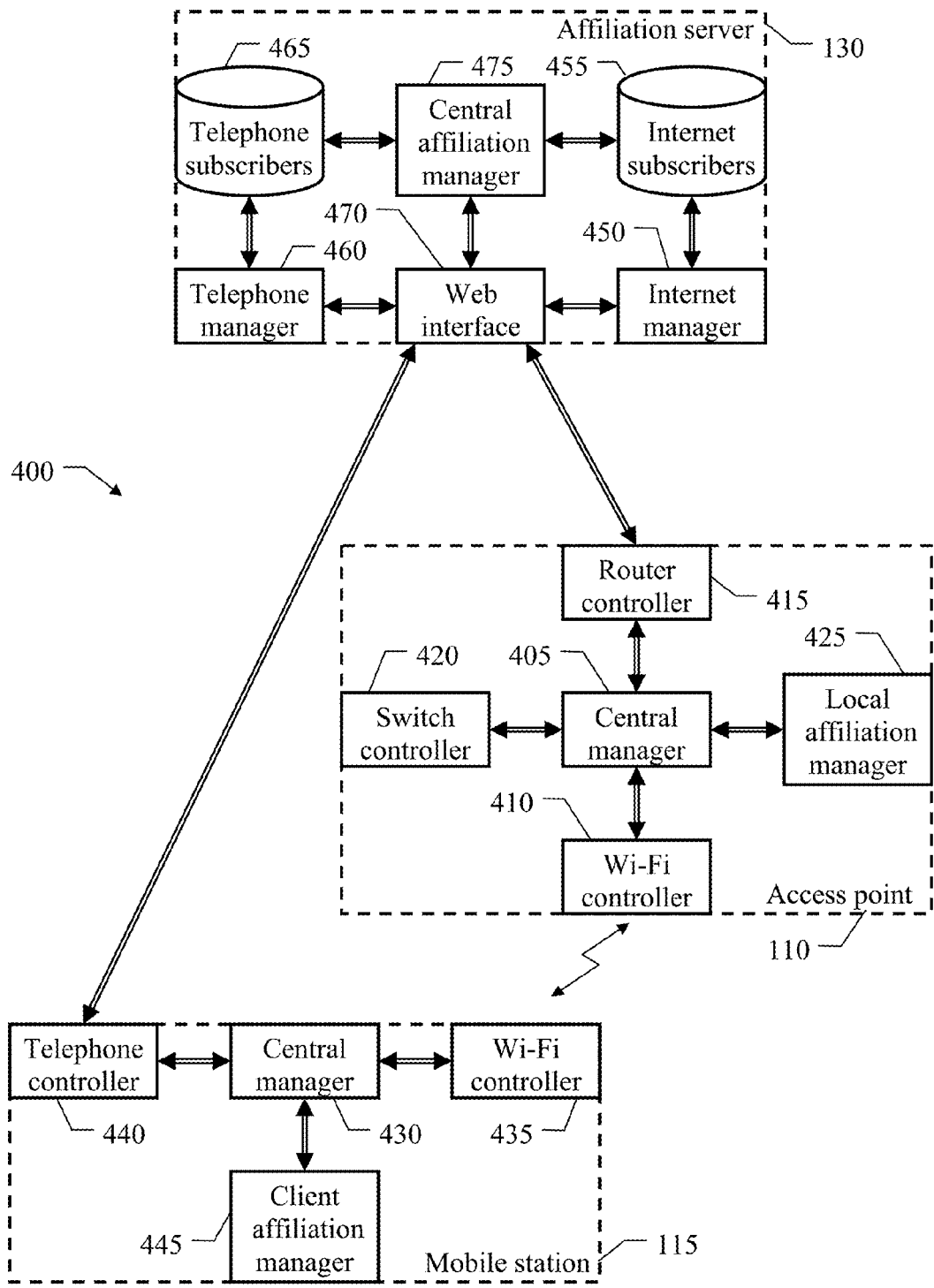
FIG. 4 shows the main software components that may be used to implement the solution according to an embodiment of the invention.

The main software components that may be used to implement the solution according to an embodiment of the invention are shown in the FIG. 4.

These software components are denoted as a whole with the reference 400. The information (programs and data) is typically stored on the mass memory (i.e., E$^2$PROM, flash memory or hard-disk) and loaded (at least partially) into the working memory of each data processing device of the above-described system (i.e., access point, mobile station and affiliation server) when the programs are running (together with possible other programs, not shown in the figure); the programs are pre-installed on the mass memory (for example, in the case of the access points and the mobile stations) or are installed thereon from optical disks (for example, in the case of the affiliation server).

With reference in particular to a generic access point 110, a central manager 405 manages operation of the access point 110. For this purpose, the central manager 405 interfaces with a Wi-Fi controller 410, which implements the communications with the mobile stations within its transmission range. The central manager 405 also interfaces with a router controller 415, which implements the access to the Internet (not shown in the figure), and in particular to the affiliation server 130, and with a switch controller 420, which implements the communications among the mobile stations connected to the access point 110. In the solution according to an embodiment of the invention, the access point 110 further comprises a (local) affiliation manger 425, which interfaces with the central manager 405 for implementing the functions relating to its affiliation (to one or more affiliation groups).

Moving now to a generic mobile station 115, a central manager 430 manages operation of the mobile station 115. For this purpose, the central manager 430 interfaces with a Wi-Fi controller 435, which implements the communications with any available access points when the mobile station 115 is within their transmission ranges; the central manager 430 also interfaces with a mobile telephone controller 440, which implements the communications between the mobile station 115 and the mobile telephone infrastructure (not shown in the figure), and in particular with the affiliation server 130. In the solution according to an embodiment of the invention, the mobile station 115 further comprises a (client) affiliation manger 445, which interfaces with the central manager 430 for implementing the functions relating to its affiliation (to one or more affiliation groups).

With reference at the end to the affiliation server 130, an Internet manager 450 manages the function of Internet service provider, and in particular the access to the Internet by Internet subscribers thereof (comprising the access point 110); for this purpose, the Internet manager 450 controls a repository 455 of the Internet subscribers, which stores all the required information about them (for example, personal data, fixed-line telephone numbers, rate terms, and so on). A telephone manager 460 instead manages the function of mobile telephone operator, and in particular the access to the mobile telephone infrastructure by telephone subscribers thereof (comprising the mobile station 115); for this purpose, the telephone manager 460 controls a repository 465 of the telephone subscribers, which stores all the required information about them (for example, personal data, mobile telephone numbers, rate terms, and so on); particularly, the repository 465 of the telephone subscribers comprises a Home Location Register (HLR), which contains details of a Subscriber Identity Module (SIM) card of each telephone subscriber—for example, its unique International Mobile Subscriber Identity (IMSI) and Mobile Subscriber Integrated Services Digital Network-Number (MSISDN). A web interface 470 is used to access the Internet manager 450 and the telephone manager 460 over the Internet, and in particular by the access point 110 (through the fixed-line telephone network) and the mobile device 115 (through the mobile telephone network or the connection to the access point 110), respectively. In the solution according to an embodiment of the invention, the affiliation server 130 further comprises a (central) affiliation manger 475, which interfaces with the web interface 470 and accesses the repository 455 of the Internet subscribers and the repository 465 of the telephone subscribers for implementing the functions relating their affiliation to the corresponding affiliation groups.

Figure 5A:
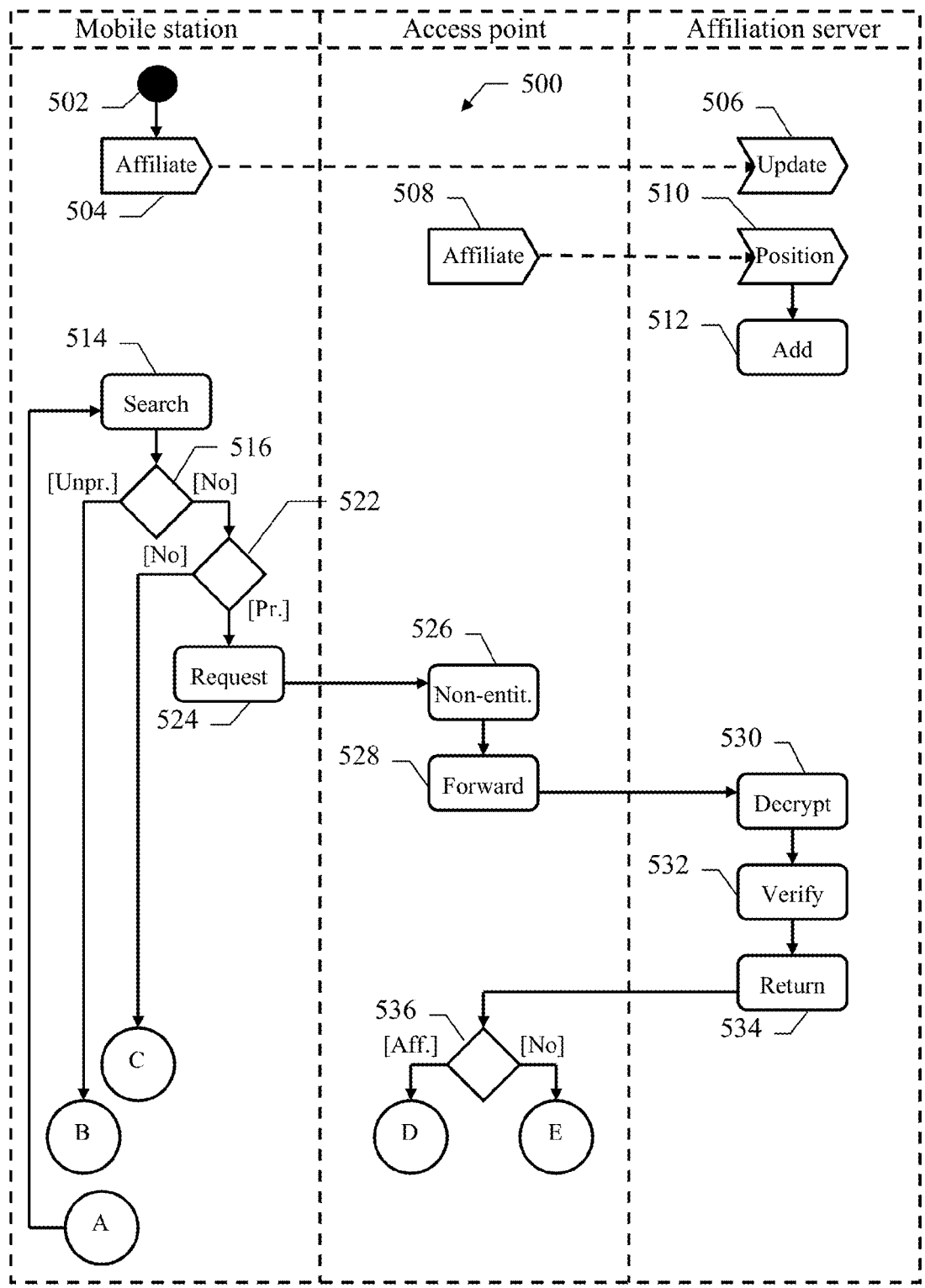
FIG. 5A-FIG. 5C show an activity diagram describing the flow of activities relating to an implementation of the solution according to an embodiment of the invention.
Figure 5B:
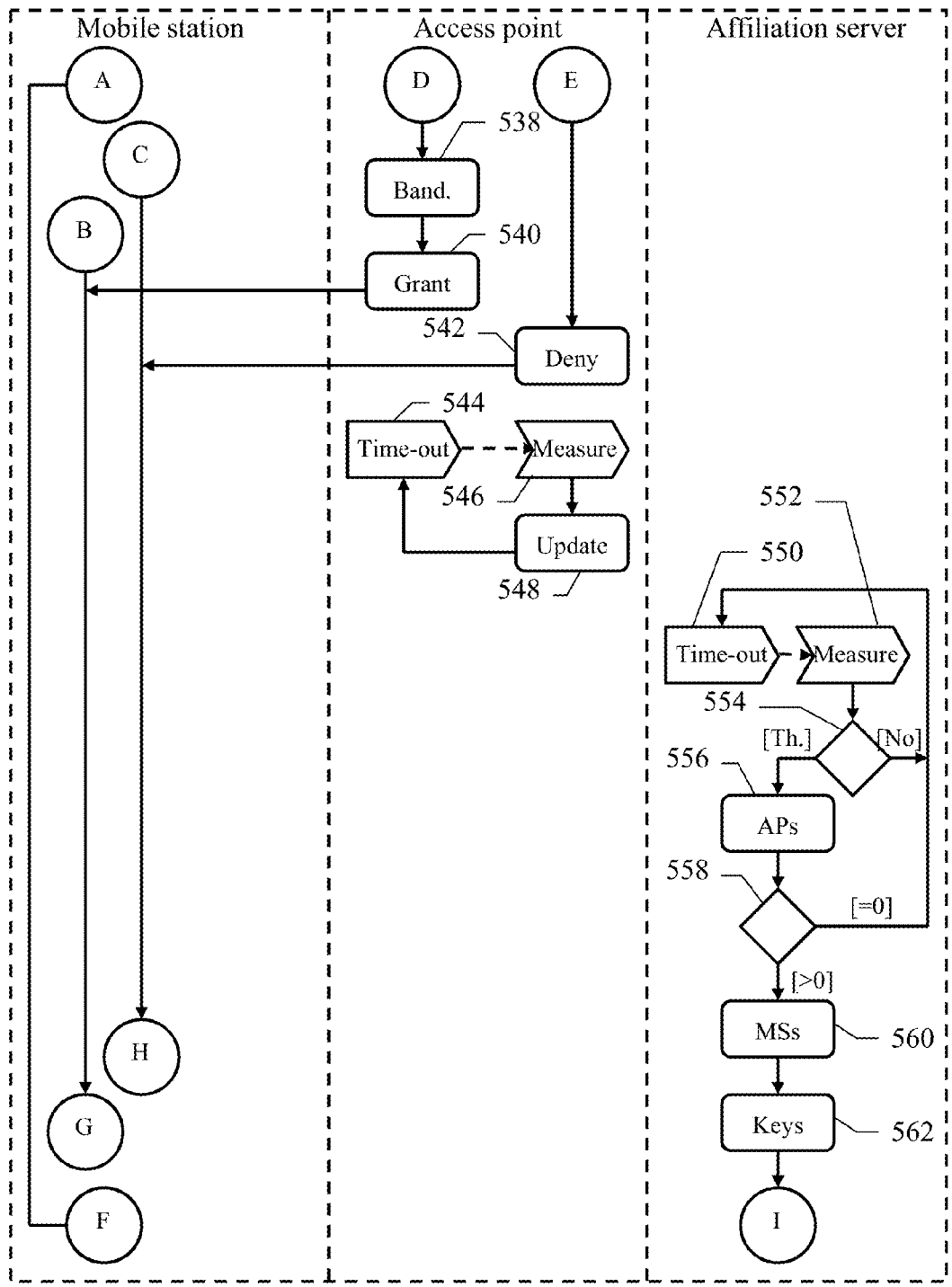
Figure 5C:
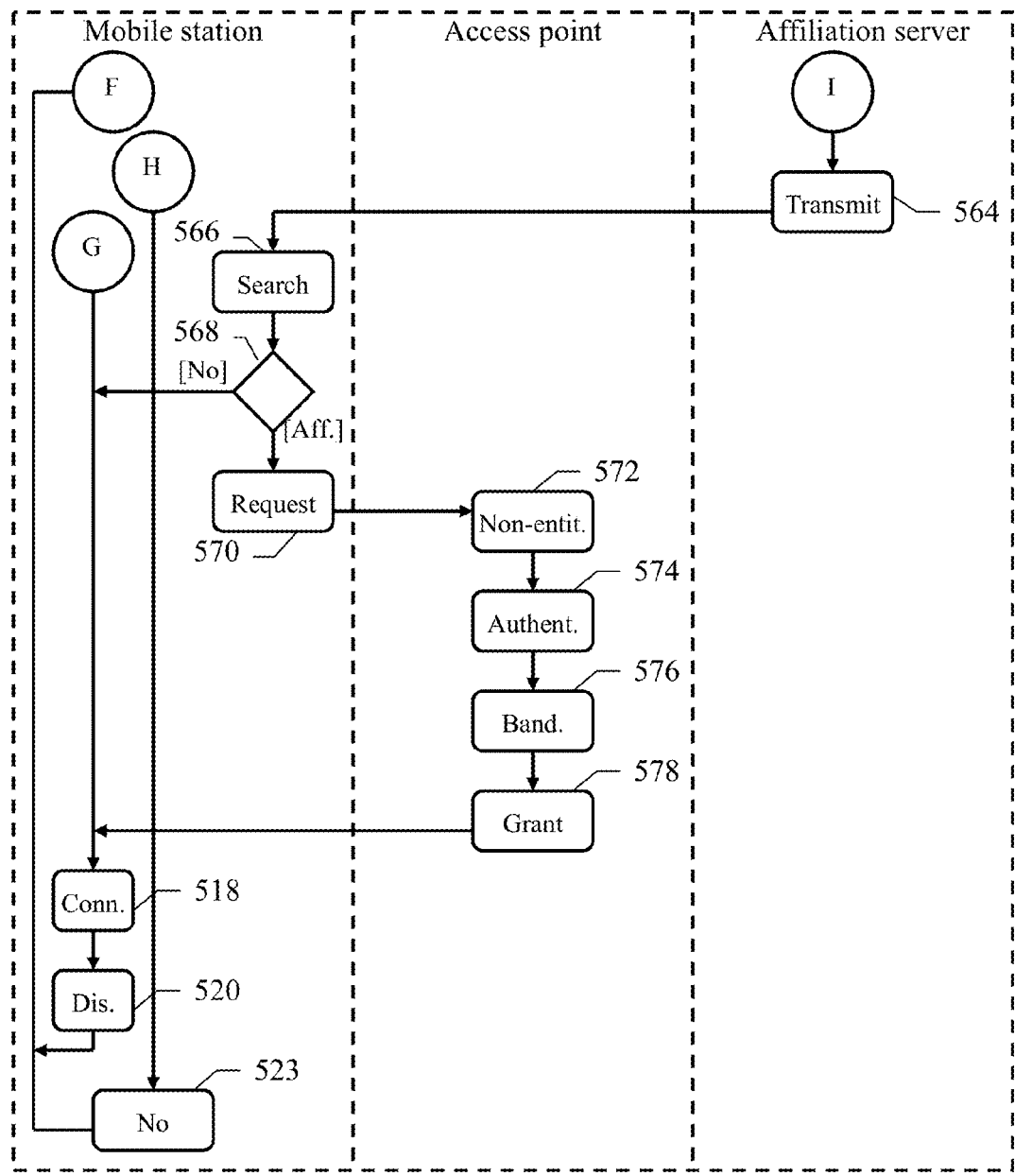

With reference now to the FIG. 5A-FIG. 5C, an activity diagram is shown describing the flow of activities relating to an implementation of the solution according to an embodiment of the invention. In this respect, each block in the diagram may represent a module, segment, or portion of code, which comprises one or more executable instructions for implementing the specified logical function(s).

Particularly, the diagram represents an exemplary implementation of the management of the affiliation of the access points and the mobile stations with a method 500. For this purpose, reference is made in the following to the 802.11 specification. In this case, information is exchanged by means of frames. Each frame comprises a header, a payload and a frame check sequence (FCS). In turn, the payload comprises four address fields, each one for storing a MAC address of 48 bits; the first address field is used to identify a receiver of the frame, the second address field is used to identify a transmitter of the frame, the third address field is used for filtering purposes by the receiver, and the fourth address field is left empty for future use.

The method begins at the black start circle 502 in the swim-lane of a generic mobile station, and then passes to block 504 when a user of the mobile station submits an affiliation request to the affiliation server (for example, by accessing a corresponding web page). In response thereto, the affiliation server at block 506 accordingly updates the entry of the mobile station in the repository of the telephone subscribers (for example, by asserting an affiliation flag in the HLR); this may also involve a change in the rate terms of the mobile station (for example, with an increase corresponding to a cost of the offered service).

Moving now to the swim-lane of a generic access point, a user thereof submits another affiliation request to the affiliation server at block 508. In response thereto, the affiliation service at block 510 determines a position of the access point through its telephone number, and then calculates a corresponding Local Area Code (LAC). Continuing to block 512, the affiliation server accordingly updates an entry of the access point in the repository of the Internet subscribers; for example, the affiliation server may generate a new IMSI for the access point, such as from its Service Set Identifier (SSID), and it may add a corresponding entry to the HLR with the affiliation flag asserted. Generally, in return the affiliation server may change the rate terms of the access point (for example, by applying a discount for the offered service) and/or it may affiliate one or more mobile stations of its user for free.

In a completely independent way, the mobile station at block 514 searches the access points that are available. Normally, this operation is performed continually when the Wi-Fi controller of the mobile station is enabled (or in response to a specific command of the user); in the solution according to an embodiment of the invention, the same operation is also performed continually when the mobile station is accessing the Internet through the mobile telephone infrastructure (even if the Wi-Fi controller is disabled). In any case, for this purpose the mobile station enables the Wi-Fi controller (if necessary) and listens for beacon frames that are broadcast periodically by any access points to announce their presence (each one comprising the SSID of the access point and information about its possible protection).

The flow of activity branches at block 516 according to a result of the search. If an unprotected access point (or more) has been found, the mobile station connects to the unprotected access point at block 518 for accessing the Internet as usual; particularly, if the mobile station was accessing the Internet through the mobile telephone infrastructure the mobile station roams to the unprotected access point with a handover (or handoff) operation known per se (for example, as described in the above mentioned document US-A-2005/0025164). The method then passes to block 520 as soon as the mobile station disconnects from the access point (for example, because it has exited from its transmission range, or in response to a corresponding command). If the mobile station was previously accessing the Internet through the mobile telephone infrastructure (as indicated by a corresponding flag that has been saved beforehand), the mobile station roams back to it. The flow of activity then returns to the block 514 to repeat the search of further access points.

Conversely, if no unprotected access point has been found at the block 516 the method further branches at block 522 according to whether any protected access points have been found. If not, the mobile station cannot connect to any access point at block 523; the method then returns to the block 514 in order to repeat the search for further access points (that may become available, for example, as the mobile station enters their transmission ranges). Conversely, if one or more protected access points have been found, the mobile station at block 524 tries to connect to each one of them (as identified by its SSID extracted from the corresponding beacon frame) by submitting thereto an association request frame (comprising the MAC address of its WNIC); in the solution according to an embodiment of the invention, the association request frame also comprises the IMSI of the mobile station encrypted with a public key of the affiliation server (for example, in the unused 48 bits of the fourth address field).

The association request frame is received at block 526 by the access point (listening for any frames addressed thereto, as indicated by its SSID within them). In this case, the mobile station is recognized as being not enabled to connect to the access point (for example, because its MAC address in the association request frame is not registered with the access point and/or the association request frame does not contain its password). In the solution according to an embodiment of the invention, in this case the access point forwards the encrypted IMAC of the mobile station (extracted from the association request frame) to the affiliation server at block 528.

Moving to block 530 in the swim-lane of the affiliation server, the IMAC of the mobile station is decrypted by using a private key of the affiliation server. Continuing to block 532, the affiliation server verifies whether the mobile station is affiliated (i.e., whether the affiliation flag of the corresponding entry in the HLR, as identified by its IMAC, is asserted). The affiliation server returns an indication of a result of this verification to the access point at block 534.

The flow of activity then branches at block 536 in the swim-lane of the access point according to the returned result. If the mobile station is affiliated, the access point at block 538 assigns a limited bandwidth to the mobile station (for example, equal to 30-40% of its entire bandwidth). Continuing to block 540, the access point returns an association response frame to the mobile station (as identified by the MAC address of its WNIC) indicating a grant of the connection thereto. In this way, the connection to the access point is granted to the mobile station independently of its protection (for example, without requiring the registration of its MAC address with the access point nor the dissemination of the corresponding password). The mobile station may then connect to the access point as above at the block 518 (but with a limited bandwidth).

Returning to the block 536, if the mobile station is not affiliated the flow of activity descends into block 542, wherein the access point returns an association response frame to the mobile station (as identified by the MAC address of its WNIC) indicating the denial of the connection thereto. The mobile station then cannot connect to any access point at block 523 as above.

With reference again to the swim-lane of the access point, in a completely independent way the method passes from block 544 to block 546 as soon as a time-out expires (for example, every 10-30 s). In this phase, the access point measures its workload; for example, the workload may be defined by the traffic (i.e., data exchanged per time unit from a previous expiration of the time-out) of the mobile stations connected thereto. The limited bandwidth assigned to the non-entitled mobile station is updated at block 548 according to the measured workload (for example, by decreasing it when the workload is high or increasing it when the workload is low, in order to maintain a sufficient bandwidth for the entitled mobile stations). The flow of activity then returns to the block 544 waiting for a next expiration of the time-out.

In this way, the bandwidth assigned to the non-entitled mobile stations self-adapts dynamically to the workload of the access point; moreover, this ensures that the connection speed of the entitled mobile stations is not significantly affected by the addition of the non-entitled mobile stations.

Moving now to the swim-lane of the affiliation server, the method passes from block 550 to block 552 as soon as another time-out expires (for example, every 1-2 min.). In this phase, for each mobile telephone cell the affiliation server measures a load of its base station; for example, the load may be defined by the traffic (i.e., data exchanged per time unit from a previous expiration of the time-out) of the mobile stations connected thereto. The measured load is compared at block 554 with another threshold (for example, equal to 60-80% of its maximum bandwidth). If the load does not reach the threshold (meaning that the base station is working properly), the method returns to the block 550 waiting for a next expiration of the time-out. Conversely, if the load exceeds the threshold (meaning that the base station is congested) the flow of activity descends into block 556; in this phase, the affiliation server determines the affiliated access points that are located in the same local area of the base station (as indicated by their LACs in the HLR). The method then branches at block 558 according to whether any affiliated access points have been found. If not, the method again returns to the block 550 waiting for a next expiration of the time-out. Conversely, if one or more affiliated access points have been found, the affiliation server at block 560 determines the mobile stations that are currently connected to the base station (as indicated in the HLR). Continuing to block 562, the affiliation server generates a pair of private/public affiliation keys. The affiliation server at block 564 transmits one of the affiliation keys to each one of these affiliated access points; at the same time, the affiliation server transmits another one of the affiliation keys to each one of these mobile stations, together with a list of the same affiliated access points (corresponding to its position), each one identified by the corresponding SSID. In both cases, the affiliation key is associated with an expiration date (for example, after 5-10 min.). The method then returns to the block 550 waiting for a next expiration of the time-out.

Moving now to the swim-lane of the mobile station, let assume that it is currently connected to a congested base station, so that it receives the affiliation key and the list of the affiliated access points (corresponding to its position) from the affiliation server. In response thereto, the mobile station at block 566 searches the affiliated access points that are actually available; as above, for this purpose the mobile station listens for the corresponding beacon frames (comprising the SSID of the affiliated access points as indicated in the received list). The flow of activity branches at block 568 according to a result of the search. If an affiliated access point (or more) has been found, the mobile station at block 570 tries to connect to it by submitting thereto an association request frame; in the solution according to an embodiment of the invention, the association request frame also comprises authentication information of the mobile station encrypted with its affiliation key (for example, in the unused 48 bits of the fourth address field).

The association request frame is received at block 572 by the access point (listening for any frames addressed thereto, as indicated by its SSID within them); as above, the mobile station is recognized as being not enabled to connect to the access point. In the solution according to an embodiment of the invention, in this case the access point at block 574 authenticates the mobile station (according to the authentication information extracted from the association request frame) by means of its affiliation key (with the process, known per se, that typically involves the exchange of a series of messages between the access point and the mobile station). Assuming that the mobile station has been correctly authenticated (meaning that it is affiliated to the access point), as above the access point at block 576 assigns a limited bandwidth to the mobile station. Continuing to block 578, the access point returns an association response frame to the mobile station (as identified by the MAC address of its WNIC) indicating a grant of the connection thereto. The mobile station may then connect to the access point as above at the block 518 (but with the limited bandwidth).

In this way, it is possible to reduce the congestion of the mobile telephone infrastructure (by providing an alternative channel for accessing the Internet). This result is achieved without requiring the addition of any new infrastructures (since the protected access points being already available are exploited).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the invention provides a method for operating a wireless network access point, which provides an access to a network over a wireless connection; the access point is protected for limiting the access to the network to entitled users. The method comprises the following steps. A request to access the network from a mobile station is received. An entitlement of the mobile station to access the network through the access point is verified. An affiliation of the mobile station to an affiliation group of the access point is verified when the mobile station is not entitled; the affiliation group comprises a plurality of access points and a plurality of mobile stations. The access to the network is granted when the mobile station is affiliated. The access to the network is instead denied when the mobile station is not affiliated.

However, the access point may provide the access to any network (for example, a LAN) over any type of wireless connection (for example, of the WiMAX type); moreover, the access point may be protected in any way to limit the access to the network (for example, with different or additional measures, either alone or in combination—for example, based on digital certificates or hardware keys). In any case, the affiliation groups may be defined in any way (for example, with different affiliation groups entitling to different levels of access to the network).

In an embodiment of the invention, the step of granting the access to the network when the mobile station is affiliated comprises granting the access to the network in a limited access mode with respect to the entitled users.

However, the limited access mode may be of any type (see below); in any case, the possibility of granting the access to the affiliated mobile stations exactly as to the entitled users is not excluded.

In an embodiment of the invention, the step of granting the access to the network in a limited access mode comprises granting the access to the network with a limited bandwidth.

However, the limited bandwidth may be defined in any way (for example, set to a predefined fixed value); in any case, the limited access mode may have different or additional constraints, either alone or on combination (for example, a timeout of the connection, a cap of the data that may be downloaded, and the like).

In an embodiment of the invention, the method further comprises the steps of monitoring a workload of the access point, and updating the limited bandwidth according to the workload.

However, the workload of the access point may be monitored in any way (for example, with another periodicity) and it may be defined in any way (for example, by different or additional metrics, either alone or in combination—for example, the number of connected mobile stations). In any case, nothing prevents maintaining the limited bandwidth fixed, even at one out of different values (for example, depending on the time of the day).

In an embodiment of the invention, the step of receiving a request to access the network from a mobile station comprises receiving an encrypted identifier of the mobile station. The step of verifying an affiliation of the mobile station comprises forwarding the encrypted identifier to an affiliation server over the network (to cause the affiliation server to decrypt the encrypted identifier and verify an inclusion of the decrypted identifier in the affiliation group), and receiving an indication of the verification of the inclusion of the decrypted identifier in the affiliation group from the affiliation server.

However, the affiliation of the mobile station may be verified by means of any information (for example, the MAC address of the mobile station) and in any way (for example, directly by the access point that periodically downloads a list of all the mobile stations affiliated thereto).

Another embodiment of the invention provides a method for operating a mobile station for accessing a network. The method comprises the following steps. A request to access the network is submitted to a wireless network access point, which provides an access to the network over a wireless connection; the access point is protected for limiting the access to the network to entitled users. A grant of the access to the network is received when the mobile station is not entitled to access the network through the access point but the access point is affiliated to an affiliation group of the mobile station; the affiliation group comprises a plurality of access points and a plurality of mobile stations. A denial of the access to the network is instead received when the mobile station is not entitled to access the network through the access point and the mobile station is not affiliated.

However, in addition to the considerations set out above, the mobile station may be of any type (for example, a netbook, a tablet).

In an embodiment of the invention, the method further comprises the steps of detecting an availability of any affiliated access point, and roaming the access to the network from a mobile telephone infrastructure to the affiliated access point.

However, the affiliated access point may be detected in any way (for example, notified by a peer mobile station or by the mobile telephone operator).

In an embodiment of the invention, the method further comprises the steps of receiving an indication of a set of affiliated access points associated with a position of the mobile station from an affiliation server, and roaming the access to the network from a further mobile telephone infrastructure to a selected one of the affiliated access points.

However, the indication of the affiliated access points may be received in any way (for example, notified by a peer mobile station).

In any case, the possibility of using the above-described technique only for accessing the network directly when it is necessary (without any roaming from any mobile telephone infrastructure) is not excluded.

In an embodiment of the invention, the step of roaming the access to the network from a further mobile telephone infrastructure to a selected one of the affiliated access points comprises authenticating the mobile station with the selected affiliated access point by means of an authentication key received together with the indication of the affiliated access points.

However, the mobile station may authenticate with the selected affiliated access point in any way (for example, by simply transmitting, to each access point, a list of the affiliated mobile stations that may try to connect thereto); moreover, nothing prevents verifying the affiliation of the mobile station as above in this case as well.

Another embodiment of the invention provides a method for operating a mobile telephone infrastructure providing an access to a network over a mobile telephone connection. The method comprises the following steps. For each mobile station currently accessing the network through the mobile telephone infrastructure, a set of affiliated access points affiliated to an affiliation group of the mobile station is determined; the affiliation group comprises a plurality of access points and a plurality of mobile stations, and it is associated with a position of the mobile station (with each affiliated access point that provides an access to the network over a wireless connection and is protected for limiting the access to the network to entitled users). To each selected mobile station whose set of affiliated access points is not empty, an indication of the associated access points is transmitted to cause the selected mobile station to roam the access to the network through a selected one of the affiliated access points.

However, in addition to the considerations set out above, the mobile telephone infrastructure may be of any type (for example, GPRS, Edge, UMTS, 4 G).

In an embodiment of the invention, the method further comprises the steps of providing a pair of authentication keys for each selected mobile station, and transmitting a first one of the corresponding authentication keys to each selected mobile station and a second one of the corresponding authentication keys to each one of the affiliated access points (to cause the selected mobile station and the selected affiliated access point to authenticate by means of the corresponding pair of authentication keys).

However, as above any other technique may be used to cause the authentication of the mobile station with the selected affiliated access point.

In an embodiment of the invention, the method further comprises the step of monitoring a load of each local area of the mobile telephone infrastructure; the affiliated access points is determined for each mobile station currently accessing the network through the mobile telephone infrastructure in each local area when the corresponding load exceeds a threshold.

However, the load of the mobile telephone infrastructure may be monitored in any way (for example, with another periodicity or at the level of groups of base stations) and it may be defined in any way (for example, by different or additional metrics, either alone or in combination—for example, the number of connected mobile stations). In any case, nothing prevents implementing the above-described technique continually (even independently of the load of the mobile telephone infrastructure).

In an embodiment of the invention, the method further comprises the following steps. An affiliation request is received from a new access point. A local area of the mobile telephone infrastructure which the new access point belongs to is determined. An indication of the affiliation of the new access point together with the corresponding local area is stored; the affiliated access points of each mobile station are determined as the affiliated access points belonging to the same local area of the mobile station.

However, the local area of each access point may be defined in any way (for example, by its GPS coordinates). In any case, this information may also be collected at run-time when it is necessary.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the invention provides a computer program comprising code means for causing a data-processing system (i.e., access point, mobile station or affiliation server) to perform the steps of the above-described methods when the computer program is executed on the data-processing system.

However, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the specific case of the access point, the program code may execute entirely on the access point, partly on the access point as a stand-alone software package, partly on the access point and partly on a remote computer or entirely on the remote computer or server. In the latter scenario, the remote computer may be connected to the access point through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks. These computer program instructions may also be stored in a computer readable medium that can direct a computer, other programmable data-processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data-processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the invention provides a system (i.e., access point, mobile station or affiliation server), which comprises means for performing the steps of the same methods as above.

However, the system may be implemented in any way (for example, with the affiliation server that is independent of the mobile telephone operator and/or the Internet service provider—for example, providing an independent service in the Internet). Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries.

The invention claimed is:

1. A method, in a data processing system, for operating a wireless network access point providing an access to a network over a wireless connection, the wireless network access point being protected for limiting the access to the network to entitled users, the method comprising:
    receiving a request to access the network from a mobile station,
    submitting a request to access the network to the wireless network access point providing access to the network over the wireless connection,
    verifying an entitlement of the mobile station to access the network through the wireless network access point,
    verifying an affiliation of the mobile station to an affiliation group of the wireless network access point when the mobile station is not entitled, the affiliation group comprising a plurality of wireless network access points and a plurality of mobile stations,
    receiving a grant of the access to the network when the mobile station is not entitled to access the network through the wireless network access point but the wireless network access point is affiliated to the affiliation group of the mobile station and granting the access to the network, and
    receiving a denial of the access to the network when the mobile station is not entitled to access the network through the wireless network access point and the mobile station is not affiliated and denying the access to the network.

2. The method according to claim 1, wherein granting the access to the network when the mobile station is affiliated comprises:
    granting the access to the network in a limited access mode with respect to the entitled users.

3. The method according to claim 2, wherein granting the access to the network in a limited access mode comprises:
    granting the access to the network with a limited bandwidth.

4. The method according to claim 3, further comprising:
    monitoring a workload of the wireless network access point, and
    updating the limited bandwidth according to the workload.

5. The method according to claim 1, wherein receiving the request to access the network from a mobile station comprises:
    receiving an encrypted identifier of the mobile station, and wherein verifying the affiliation of the mobile station comprises:
    forwarding the encrypted identifier to an affiliation server over the network to cause the affiliation server to decrypt the encrypted identifier and verify an inclusion of the decrypted identifier in the affiliation group, and
    receiving an indication of the verification of the inclusion of the decrypted identifier in the affiliation group from the affiliation server.

6. The method according to claim 1, wherein the mobile station further access the network by the method comprising:
    detecting an availability of any affiliated wireless network access point, and
    roaming the access to the network from a mobile telephone infrastructure to the affiliated wireless network access point.

7. The method according to claim 1, wherein the mobile station further access the network by the method comprising:
    receiving an indication of a set of affiliated wireless network access points associated with a position of the mobile station from an affiliation server, and
    roaming the access to the network from a further mobile telephone infrastructure to a selected one of the affiliated wireless network access points.

8. The method according to claim 7, wherein the mobile station roaming the access to the network from a further mobile telephone infrastructure to a selected one of the affiliated access points comprises:
    authenticating the mobile station with the selected affiliated wireless network access point by means of an authentication key received together with the indication of the affiliated wireless network access points.

9. A computer program product comprising a non-transitory computer readable storage medium having a computer readable program stored therein for operating a wireless network access point providing an access to a network over a wireless connection, the wireless network access point being protected for limiting the access to the network to entitled users, wherein the computer readable program, when executed on a computing device, causes the computing device to:
    receive a request to access the network from a mobile station,
    submit a request to access the network to the wireless network access point providing access to the network over the wireless connection,
    verify an entitlement of the mobile station to access the network through the wireless network access point,
    verify an affiliation of the mobile station to an affiliation group of the wireless network access point when the mobile station is not entitled, the affiliation group comprising a plurality of wireless network access points and a plurality of mobile stations,
    receive a grant of the access to the network when the mobile station is not entitled to access the network through the wireless network access point but the wireless network access point is affiliated to the affiliation group of the mobile station and grant the access to the network, and
    receive a denial of the access to the network when the mobile station is not entitled to access the network through the wireless network access point and the mobile station is not affiliated arid deny the access to the network.

10. The computer program product according to claim 9, wherein the computer readable program to receive the request to access the network from a mobile station further causes the computing device to:
    receive an encrypted identifier of the mobile station, and wherein the computer readable program to verify the affiliation of the mobile station comprises:
    forward the encrypted identifier to an affiliation server over the network to cause the affiliation server to decrypt the encrypted identifier and verify an inclusion of the decrypted identifier in the affiliation group, and receive an indication of the verification of the inclusion of the decrypted identifier in the affiliation group from the affiliation server.

11. A system for operating a wireless network access point providing an access to a network over a wireless connection, the wireless network access point being protected for limiting the access to the network to entitled users comprising:

a processor; and a memory coupled to the processor, wherein the memory comprises instructions which, when executed by the processor, cause the processor to:

receive a request to access the network from a mobile station, submit a request to access the network to the wireless network access point providing access to the network over the wireless connection, verify an entitlement of the mobile station to access the network through the wireless network access point, verify an affiliation of the mobile station to an affiliation group of the wireless network access point when the mobile station is not entitled, the affiliation group comprising a plurality of wireless network access points and a plurality of mobile stations, receive a grant of the access to the network when the mobile station is not entitled to access the network through the wireless network access point but the wireless network access point is affiliated to the affiliation group of the mobile station and grant the access to the network, and receive a denial of the access to the network when the mobile station is not entitled to access the network through the wireless network access point and the mobile station is not affiliated and deny the access to the network.

12. The system according to claim 11, wherein the instructions to receive the request to access the network from a mobile station further cause the processor to:

receive an encrypted identifier of the mobile station, and wherein the computer readable program to verify the affiliation of the mobile station comprises:

forward the encrypted identifier to an affiliation server over the network to cause the affiliation server to decrypt the encrypted identifier and verify an inclusion of the decrypted identifier in the affiliation group, and receive an indication of the verification of the inclusion of the decrypted identifier in the affiliation group from the affiliation server.

13. The system according to claim 11, wherein the instructions to grant the access to the network when the mobile station is affiliated further cause the processor to:

grant the access to the network in a limited access mode with respect to the entitled users.

14. The system according to claim 13, wherein the instructions to grant the access to the network in a limited access mode further causes the processor to:

grant the access to the network with a limited bandwidth.

15. The system according to claim 14, wherein the instructions further cause the processor to:

monitor a workload of the wireless network access point, and update the limited bandwidth according to the workload.

16. The computer program product according to claim 9, wherein the computer readable program to grant the access to the network when the mobile station is affiliated further causes the computing device to:

grant the access to the network in a limited access mode with respect to the entitled users.

17. The computer program product according to claim 16, wherein the computer readable program to grant the access to the network in a limited access mode further causes the computing device:

grant the access to the network with a limited bandwidth.

18. The computer program product according to claim 17, wherein the computer readable program further causes the computing device to:

monitor a workload of the wireless network access point, and update the limited bandwidth according to the workload.

* * * * *